J. A. MAGRUDER.
CALYX REPAIR DEVICE.
APPLICATION FILED NOV. 10, 1908.

910,300.

Patented Jan. 19, 1909.

Witnesses:
Alx. Scott
Willis B. Magruder.

Inventor:
John A. Magruder.

UNITED STATES PATENT OFFICE.

JOHN A. MAGRUDER, OF BROOKLAND, DISTRICT OF COLUMBIA.

CALYX-REPAIR DEVICE.

No. 910,300.   Specification of Letters Patent.   Patented Jan. 19, 1909.

Application filed November 10, 1908. Serial No. 461,888.

*To all whom it may concern:*

Be it known that I, JOHN A. MAGRUDER, a citizen of the United States, residing at Brookland, District of Columbia, have invented certain new and useful Improvements in Calyx-Repair Devices, of which the following is a specification.

My invention relates to certain new and useful improvements in calyx repair devices for supporting the petals of carnations and the like, in which the calyx has become split.

In the growth of carnations it is not unusual for the flower in its development to split the calyx on one side thereof, the flower afterwards developing to its full extent, but the split calyx allowing the petals of the flower to fall down on one side, and, in consequence, a flower of no marketable value results.

The cause of the splitting of the calyx is due to an uneven development in the petals, usually caused by bad weather stunting the growth of the outer part of the calyx, while the inclosed petals develop to such an extent that a sudden change of temperature may cause the breaking of the calyx. Subsequenly the petals develop more rapidly and fall over and through the slit, thereby producing an imperfect flower.

Prior to my invention attempts have been made to render such imperfect flowers marketable, and one means of effecting this result has been to surround the calyx with a wire fastener or small rubber band. This not only detracts from the appearance of the flower, but has the effect of causing the flower to close up, due to the pressure upon the calyx.

Another device which has been used for closing the slit consists in tying the two edges of the slit together by means of a wire passed through the calyx adjacent the edges of the slit. This requires the use of a tool, is very tedious to do, and disfigures the appearance of the flower.

My invention consists in providing a strip of material adapted to be inserted between the petals and the calyx, so that the body of the strip will bridge the slit, and consequently support the petals in the position they occupy in a flower having an unsplit calyx. This strip I preferably form with one edge cut to represent the upper edge of the calyx and colored the color of the calyx, so that after it has been placed in position its presence can only be detected by the closest examination to the flower.

My invention also consists in a device of treating flowers having split calyxes, whereby they are rendered equally valuable to flowers in which the calyxes have not split.

Figure 1:
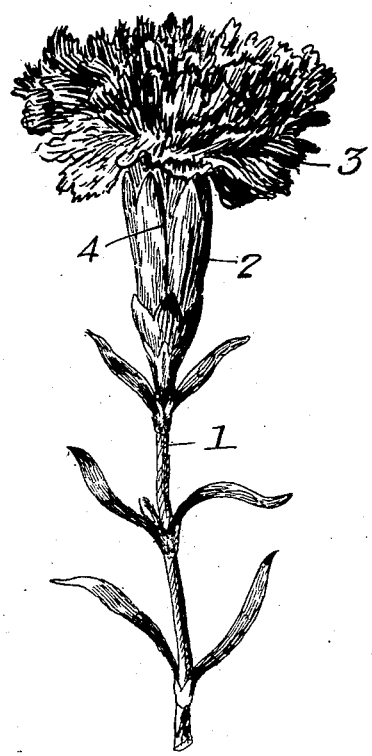
Figure 2:
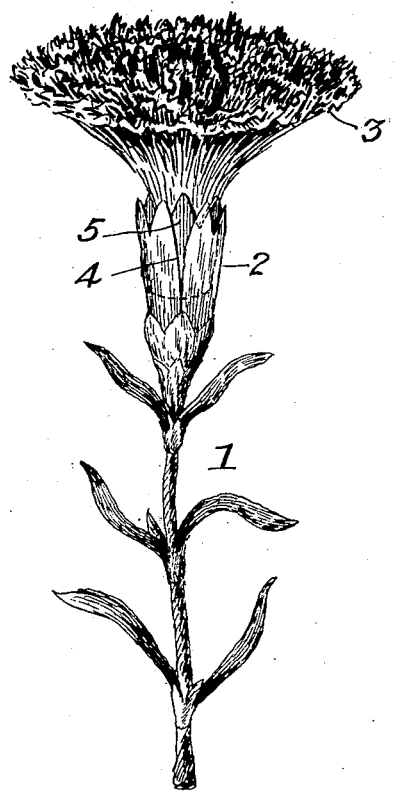
Figure 3:
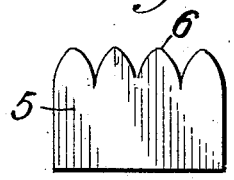
Figure 4:

Referring to the drawing, wherein I illustrate the preferred form of my invention and the preferred method of carrying the same into effect, and wherein the same part is designated by the same reference numeral wherever it occurs, Figure 1 is a perspective view of a carnation having a split calyx; Fig. 2 is a similar view of the same flower after having been treated in accordance with my method; Fig. 3 is a view of the preferred form of strip by which the slit in the calyx is closed; Fig. 4 is a perspective view of preferred form of strip, formed in position as used.

1 designates the stem of a carnation or similar flower; 2, the calyx, and 3 the petals; 4, a split in the side of the calyx.

5 is a strip of any suitable material, preferably paper, which, in order to make the same waterproof, may be paraffined, one edge of which is preferably cut to represent the upper edge of the calyx, as shown at 6. Instead of paper, any other suitable material, as tin, zinc, or lead, may be substituted, the only thing necessary being that it have sufficient stiffness to bridge the slit 5 when placed in position, and pliable enough to be readily bent around the petals. The strip is preferably colored to match the color of the calyx of the flower to be treated.

In using my device, when it is desired to treat a flower having a split calyx, one of the strips above described is inserted between the petals and the calyx, so that the body of the strip spans the slit, and, if desired, the ends of the strip may be bent in to snugly engage the petals. The strip will now operate to support the petals in their natural position.

I realize that considerable variation is possible in the details of construction and arrangement of parts without departing from the spirit of my invention, and I therefore do not intend to limit myself to the specific form shown and described.

I claim—

1. An article of manufacture, for repairing flowers, comprising a strip of suitable material cut in imitation of the calyx and colored to correspond with said calyx.

2. An article of manufacture, for repairing flowers, comprising a strip of suitable material having one edge cut in imitation of the upper edge of the calyx and colored to correspond with said calyx.

3. As a new article of manufacture, a device for treating carnations or the like in which the calyx has split, which consists of a strip of suitable material having one edge cut in imitation of the upper edge of the calyx, and adapted to be inserted between the calyx and the petals, with its body portion bridging the slit.

In testimony whereof I affix my signature in presence of two witnesses.

JOHN A. MAGRUDER.

Witnesses:
ALEX. SCOTT,
WILLIS B. MAGRUDER.